United States Patent [19]

Pavitt

[11] 4,271,599
[45] Jun. 9, 1981

[54] WHEEL CAMBER AND CASTOR MEASUREMENT APPARATUS

[76] Inventor: Frederick C. Pavitt, 2-54 Avoca St., Randwick, New South Wales 2031, Australia

[21] Appl. No.: 32,592

[22] Filed: Apr. 23, 1979

[51] Int. Cl.³ .............................................. G01B 5/255
[52] U.S. Cl. .................................... 33/336; 33/203.18
[58] Field of Search ..................... 33/203, 203.18, 335, 33/336, 337, 203.15, 203.17

[56] References Cited

U.S. PATENT DOCUMENTS

| 1,209,345 | 12/1916 | Smith | 33/203.15 |
| 1,601,261 | 9/1926 | Prather | 33/203.15 |
| 1,974,006 | 9/1934 | Bennett | 33/335 |
| 2,554,621 | 5/1951 | Jacobsen et al. | 33/336 |
| 2,603,881 | 7/1952 | Holaday | 33/203.45 |

FOREIGN PATENT DOCUMENTS

| 475064 | 7/1951 | Canada | 33/203 |
| 998680 | 9/1951 | France | 33/203.15 |

Primary Examiner—William D. Martin, Jr.
Attorney, Agent, or Firm—Ladas & Parry

[57] ABSTRACT

Apparatus for use in measuring the camber and castor of a motor vehicle wheel comprises two slidably adjustable parallel rods which engage either the rim of the vehicle wheel or suspension members. A spirit level is used to measure the inclination of the rods relative to the horizontal for determining the castor or camber of the wheel.

4 Claims, 1 Drawing Figure

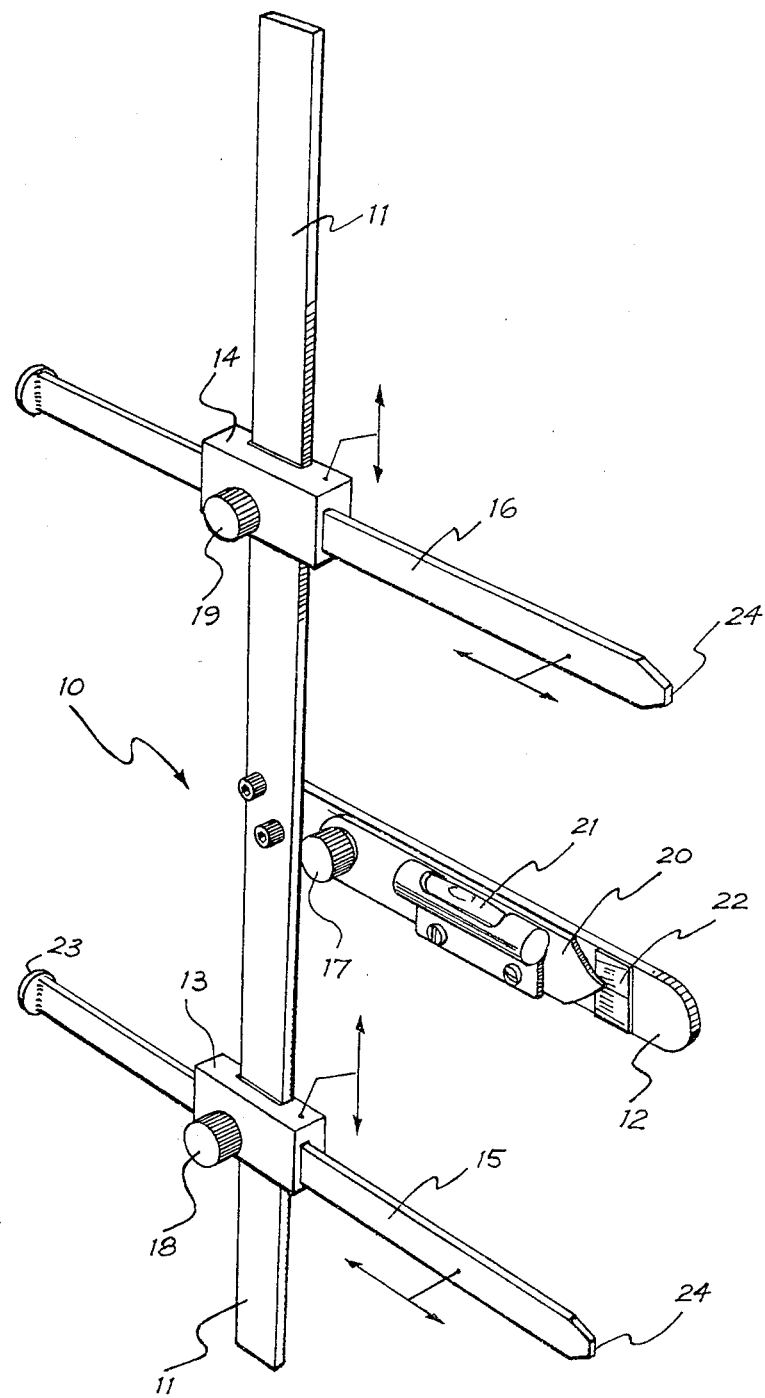

WHEEL CAMBER AND CASTOR MEASUREMENT APPARATUS

The present invention relates to apparatus for wheel aligning motor vehicles and more particularly, but not exclusively to apparatus for measuring the camber and/or castor of motor vehicle wheels.

Apparatus usually employed to measure and/or adjust the camber and castor of motor vehicle wheels is usually complex and accordingly is expensive and time-consuming to operate.

It is the object of the present invention to provide an apparatus to be used for the adjusting of the camber and/or castor of motor vehicle wheels, which apparatus is simple to manufacture and easy to use.

In broad form the present invention is an apparatus for use in measuring the camber and castor of a motor vehicle wheel comprising: a main frame two parallel rods extending from and at spaced locations on the main frame; clamp means selectively slidably attaching the rods to the main frame so that said rods are movable along the longitudinal axis and in a direction normal to the longitudinal axes of the rods so that the rods are movable relative to each other to adjust the spacing between the rods; abutment means on each rod at adjacent ends of the rods, said abutment means each having a planar end surface normal to the axes of the rods to engage a suspension member; and calibrated means mounted on the main frame to determine the inclination of the rods to the horizontal when the rods are abutting a portion of the vehicle from which the castor or camber may be determined.

A preferred form of the present invention will now be described by way of example with reference to the accompanying drawing.

In the drawing the camber and castor indicating means 10 has a frame comprising a generally "T" shaped member having portions 11 and 12. Attached to the portion 11 at spaced locations are clamps 13 and 14 which are slidable on the portion 11 in a generally longitudinal direction and may be fixed to the portion 11 by means of the rotation of nuts 18 and 19. Also slidable through the clamps 13 and 14 so as to be reversed are longitudinal members 15 and 16 to enable them to be reversed and to enable longitudinal movement with respect to their longitudinal axes and may be fixed relative to the portion 11 again by rotation of nuts 18 and 19.

Pivotally attached to portion 11 by means of nut 17 is indicator 20 to which is attached a spirit level 21, while marked on the portion 12 is a scale 22.

In operation the camber and castor of a motor vehicle wheel may be measured by adjusting the members 15 and 16 so that their points 24 are equally spaced from their respective clamp 13 or 14. Thereafter the points 24 are placed against portions of the wheel assembly at generally vertically aligned location, for instance, at upper and lower ball pivot points which support the wheel assembly when measuring castor and at disc or drum flange when measuring camber. Since the members 15 and 16 are parallel to the member 12 the adjustment of the indicator 20, by means of spirit level 21, so as to extend in a horizontal direction, indicates the camber or castor of the wheel on the scale 22.

The ends of the member 15 and 16 are provided with abutments 23 which, when the members 15 and 16 are reversed may be used to contact a suspension member.

What I claim is:

1. Apparatus adapted to be hand held by an operator for use in measuring the camber and castor of a motor vehicle wheel comprising: a main frame; two parallel generally co-extensive rods extending from and at spaced locations on the main frame so as to be located in use within a common generally vertical plane; clamp means selectively slidably attaching the rods to the main frame so that said rods are movable along their longitudinal axes through the clamp means and in a direction normal to the longitudinal axes of the rods so that the rods are movable relative to each other to adjust the spacing between the rods; abutment means on each rod at adjacent ends of the rods, said abutment means each having a planar end surface normal to the axes of the rods so that in use the operator positions the abutment means to engage a suspension member of the vehicle; and calibrated means mounted on the main frame to determine the inclination of the rods to the horizontal when the rods are abutting a portion of the vehicle from which the castor or camber may be determined, wherein said calibration means includes an arm fixed to said frame and extending generally within said plane defined by said rods, and a spirit level means pivotally attached to said arm to thereby enable measurement of the inclination thereof and therefore the inclination of said rods.

2. The apparatus of claim 1 wherein the main frame includes an elongated member to which the rods are slidably attached at longitudinally spaced positions; and said clamp means slidably engages the member to allow for the movement to adjust the space between the rods.

3. The apparatus of claim 2 wherein the calibrated means includes a spirit level.

4. The apparatus of claims 2 or 3 wherein the planar surface of said abutment means has a surface area greater than the cross-sectional area of the rods.

* * * * *